US010700551B2

(12) United States Patent
Jacobson et al.

(10) Patent No.: US 10,700,551 B2
(45) Date of Patent: Jun. 30, 2020

(54) INDUCTIVE WIRELESS POWER TRANSFER DEVICE WITH IMPROVED COUPLING FACTOR AND HIGH VOLTAGE ISOLATION

(71) Applicant: RAYTHEON COMPANY, Waltham, MA (US)

(72) Inventors: Boris S. Jacobson, Westford, MA (US); Lev Volfson, Framingham, MA (US); Sara Lorene Makowiec, Framingham, MA (US)

(73) Assignee: RAYTHEON COMPANY, Waltham, MA (US)

( * ) Notice: Subject to any disclaimer, the term of this patent is extended or adjusted under 35 U.S.C. 154(b) by 92 days.

(21) Appl. No.: 15/984,596

(22) Filed: May 21, 2018

(65) Prior Publication Data

US 2019/0356165 A1 Nov. 21, 2019

(51) Int. Cl.

| | |
|---|---|
| ***H02J 50/10*** | (2016.01) |
| ***H02J 50/70*** | (2016.01) |
| ***H01F 27/28*** | (2006.01) |
| ***H04B 5/00*** | (2006.01) |

(52) U.S. Cl.

CPC ............ *H02J 50/10* (2016.02); *H01F 27/288* (2013.01); *H02J 50/70* (2016.02); *H04B 5/0037* (2013.01); *H04B 5/0081* (2013.01)

(58) Field of Classification Search

CPC . H02J 5/005; H02J 17/00; H02J 50/12; H01F 38/14

USPC .......................................................... 307/104

See application file for complete search history.

(56) References Cited

U.S. PATENT DOCUMENTS

| | | | |
|---|---|---|---|
| 3,866,086 | A | 2/1975 | Miyoshi et al. |
| 4,176,334 | A | 11/1979 | Buritz et al. |
| 4,326,181 | A | 4/1982 | Allen |
| 4,494,100 | A | 1/1985 | Stengel et al. |
| 4,510,476 | A | 4/1985 | Clatterbuck et al. |
| 4,510,915 | A | 4/1985 | Ishikawa et al. |
| 4,613,843 | A | 9/1986 | Esper et al. |
| 4,748,532 | A | 5/1988 | Commander et al. |

(Continued)

FOREIGN PATENT DOCUMENTS

JP H02128409 A 5/1990

OTHER PUBLICATIONS

International Search Report and Written Opinion for International Application No. PCT/US2019/032853; International Filing Date May 17, 2019; dated Sep. 26, 2019 (14 pages).

*Primary Examiner* — Alfonso Perez Borroto

(74) *Attorney, Agent, or Firm* — Cantor Colburn LLP

(57) ABSTRACT

An inductive wireless power transfer device includes a primary winding assembly and a secondary winding assembly separated from the primary winding assembly by a distance. A first magnetic core cap is on the primary winding assembly and a second magnetic core cap is on the secondary winding assembly so as to magnetically couple together the primary winding assembly and the secondary winding assembly. A multi-section high voltage (HV) isolator is interposed between the primary winding assembly and the secondary winding assembly. The multi-section HV isolator includes at least one individual insulator section comprising a dielectric material, and at least one intermediate magnetic core comprising a ferrite material interposed between the primary winding assembly and the secondary winding assembly.

16 Claims, 6 Drawing Sheets

(56) References Cited

U.S. PATENT DOCUMENTS

| | | | |
|---|---|---|---|
| 4,890,083 A | | 12/1989 | Trenkler et al. |
| 5,039,964 A | | 8/1991 | Ikeda |
| 5,214,392 A | * | 5/1993 | Kobayashi .......... H01F 27/2804 330/10 |
| 5,431,987 A | | 7/1995 | Ikeda |
| 5,502,430 A | | 3/1996 | Takahashi et al. |
| 5,579,202 A | | 11/1996 | Tolfsen et al. |
| 5,592,089 A | | 1/1997 | Danby et al. |
| 5,844,451 A | | 12/1998 | Murphy |
| 6,023,161 A | | 2/2000 | Dantsker et al. |
| 6,490,176 B2 | | 12/2002 | Holzer et al. |
| 6,501,364 B1 | | 12/2002 | Hui et al. |
| 6,853,284 B2 | | 2/2005 | Nagai et al. |
| 7,191,007 B2 | | 3/2007 | Desai et al. |
| 7,378,817 B2 | | 5/2008 | Calhoon et al. |
| 7,426,125 B2 | | 9/2008 | Hu et al. |
| 7,471,986 B2 | | 12/2008 | Hatlestada |
| 8,089,331 B2 | | 1/2012 | Jacobson et al. |
| 8,097,983 B2 | | 1/2012 | Karalis et al. |
| 8,098,124 B2 | | 1/2012 | Perrillat-Amede et al. |
| 8,102,235 B2 | | 1/2012 | Hui et al. |
| 8,476,788 B2 | | 7/2013 | Karalis et al. |
| 2003/0020583 A1 | | 1/2003 | Hui et al. |
| 2003/0095027 A1 | * | 5/2003 | Shu Yuen Hui .... H01F 27/2804 336/200 |
| 2008/0278275 A1 | | 11/2008 | Fouquet et al. |
| 2009/0108975 A1 | | 4/2009 | Nomura et al. |
| 2009/0243782 A1 | | 10/2009 | Fouquet et al. |
| 2014/0084698 A1 | * | 3/2014 | Asanuma ................ H01F 38/14 307/104 |

* cited by examiner

INDUCTIVE WIRELESS POWER TRANSFER DEVICE WITH IMPROVED COUPLING FACTOR AND HIGH VOLTAGE ISOLATION

BACKGROUND

The present disclosure relates to power transfer devices, and more particularly, to wireless power transfer devices.

Inductively-coupled power transfer is gaining acceptance in military and commercial applications. Evolving undersea systems, for example, serve a variety of military and commercial applications including data communication networks, object sensing and detection systems, and vehicle hub systems. To achieve these wide-ranges of applications, conventional inductively-coupled power transfer devices aim to employ an uncomplicated and robust power interface to facilitate practical energy transfer.

SUMMARY

According to one non-limiting embodiment, an inductive wireless power transfer device includes a primary winding assembly and a secondary winding assembly separated from the primary winding assembly by a distance. A first magnetic core cap is on the primary winding assembly and a second magnetic core cap is on the secondary winding assembly so as to magnetically couple together the primary winding assembly and the secondary winding assembly. A multi-section high voltage (HV) isolator is interposed between the primary winding assembly and the secondary winding assembly. The multi-section HV isolator includes at least one individual insulator section comprising a dielectric material, and at least one intermediate magnetic core comprising a ferrite material interposed between the primary winding assembly and the secondary winding assembly.

According to another non-limiting embodiment, a method of increasing power transfer in an inductive wireless power transfer device is provided. The method comprises separating a primary winding assembly from a secondary winding assembly by a distance. The method further comprises arranging a first magnetic core cap on the primary winding assembly and arranging a second magnetic core cap on the secondary winding assembly so as to magnetically couple together the primary winding assembly and the secondary winding assembly. The method further comprises interposing a multi-section high-voltage (HV) isolator between the primary winding assembly and the secondary winding assembly so as to increase the coupling between the primary winding assembly and the secondary winding assembly. The multi-section HV isolator includes at least one individual insulator section comprising a dielectric material, and at least one intermediate magnetic core comprising a ferrite material interposed between the primary winding assembly and the secondary winding assembly.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
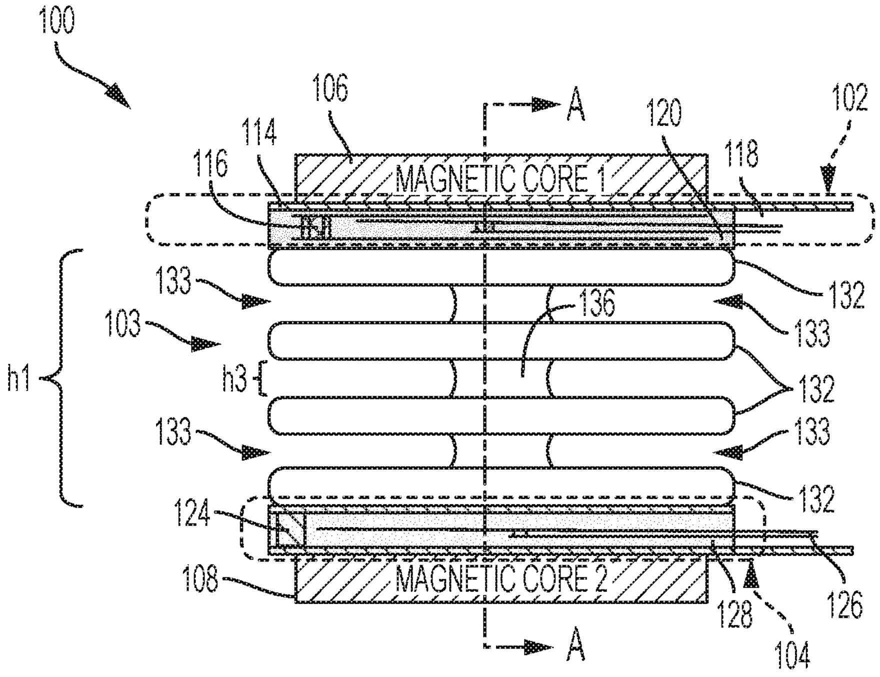
FIG. 1A is a perspective view of an inductive wireless power transfer device according to a non-limiting embodiment.

Traditional wireless energy devices were typically constructed as power transformers that required several primary-secondary interfaces such as, for example, center and outer core legs. Inductively-coupled wireless devices have been developed which reduced the number primary-secondary interfaces needed to transfer energy. Inductively-coupled wireless devices are typically required to provide high-voltage (HV) withstanding capability in the range of hundreds to thousands of volts. In addition, inductively-coupled wireless devices are typically separate from the primary winding and secondary winding coils from one another by a distance (h), while providing a magnetic coupling factor (k) that is approximately proportion to a ratio (r/h being about 1) based on the radius of wound coils with respect to the of the coil separation distance (h).

As mentioned above, however, conventional inductively-coupled power transfer devices do not provide effective voltage protection measures capable of withstanding high voltage events. For example, conventional inductively-coupled power transfer devices to date do not combine a voltage withstanding capability with sufficient magnetic coupling factor (k) because they rely only on air gaps to introduce voltage isolation regions between the primary and secondary energy transfer coils. The magnetic coupling factor is inversely proportional to the coil separation distance while power transfer efficiency is approximately proportional to the magnetic coupling factor. For this reason, using only air gaps does not allow to simultaneously provide efficient transfer power and effectively protect these conventional inductively-coupled power transfer devices from high voltage events such as, for example, lightning strikes, electromagnetic pulses, etc.

Various non-limiting embodiments described herein provide an inductive wireless HV power transfer device with high efficiency that employs a multi-section HV isolator, which includes one or more individual isolator sections interposed between a primary energy coil (i.e., primary winding) and a secondary energy coil (i.e., secondary winding). High-voltage exists between the primary energy coil and ground while the secondary energy coil is at or near (tens of volts difference at the most) to ground. The multi-section HV isolator further includes a magnetic material arranged between the primary and secondary windings to form one or more intermediate cores. The implementation of the multi-section HV isolator allows inductive wireless power transfer device to achieve a substantial improvement in power transfer efficiency compared to conventional devices, while maintaining necessary HV isolation for providing HV protection capabilities.

In at least one non-limiting embodiment, the multi-section HV isolator includes two individual sections, which are coupled together to surround around a hollowed volume, i.e., cavity. An intermediate ferrite core is disposed inside the cavity such that the intermediate ferrite core is encased in a middle core portion of the multi-section HV insulator. The multi-section HV isolator is further divided into a plurality of ring-shaped insulator sections that extend radially from a middle core portion. The insulator sections are separated from one another by an air gap or void, which achieves a sufficient creepage distance to further improve HV isolation. In yet another non-limiting embodiment, the multi-section insulator is constructed as an alternating stacked arrangement of individual insulator layers and magnetic core layers. In any of the aforementioned examples, an inductive wireless power transfer device is provided which improves voltage protection, while still facilitating inductive energy coupling to effectively transfer power in an efficient manner.

Figure 1B:
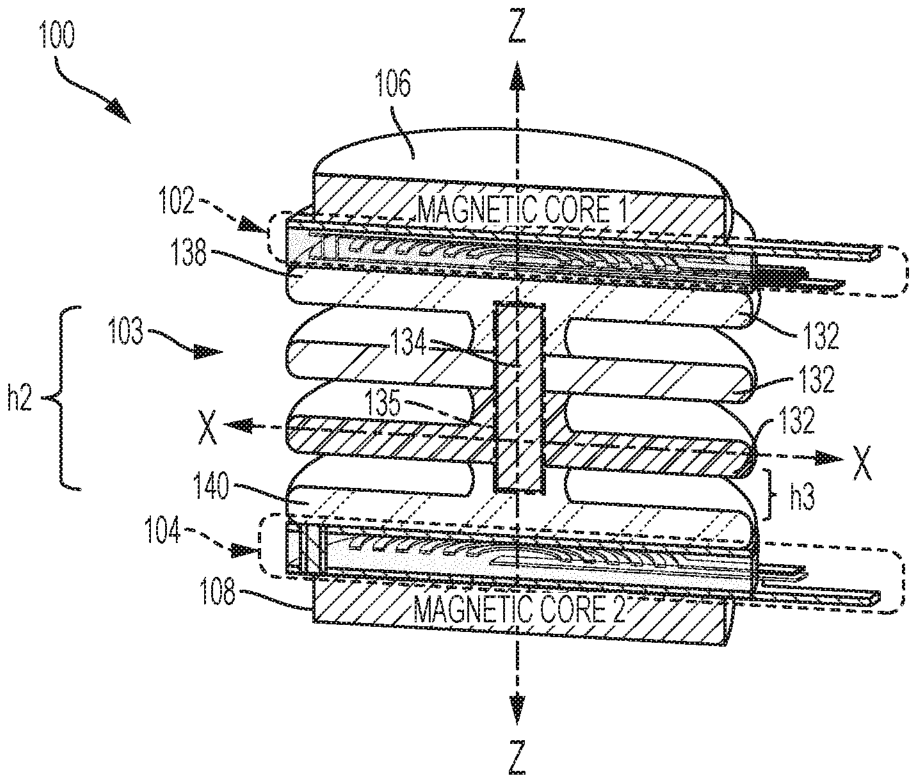
FIG. 1B is a cross-sectional view of the inductive wireless power transfer device illustrated in FIG. 1A.
Figure 1C:
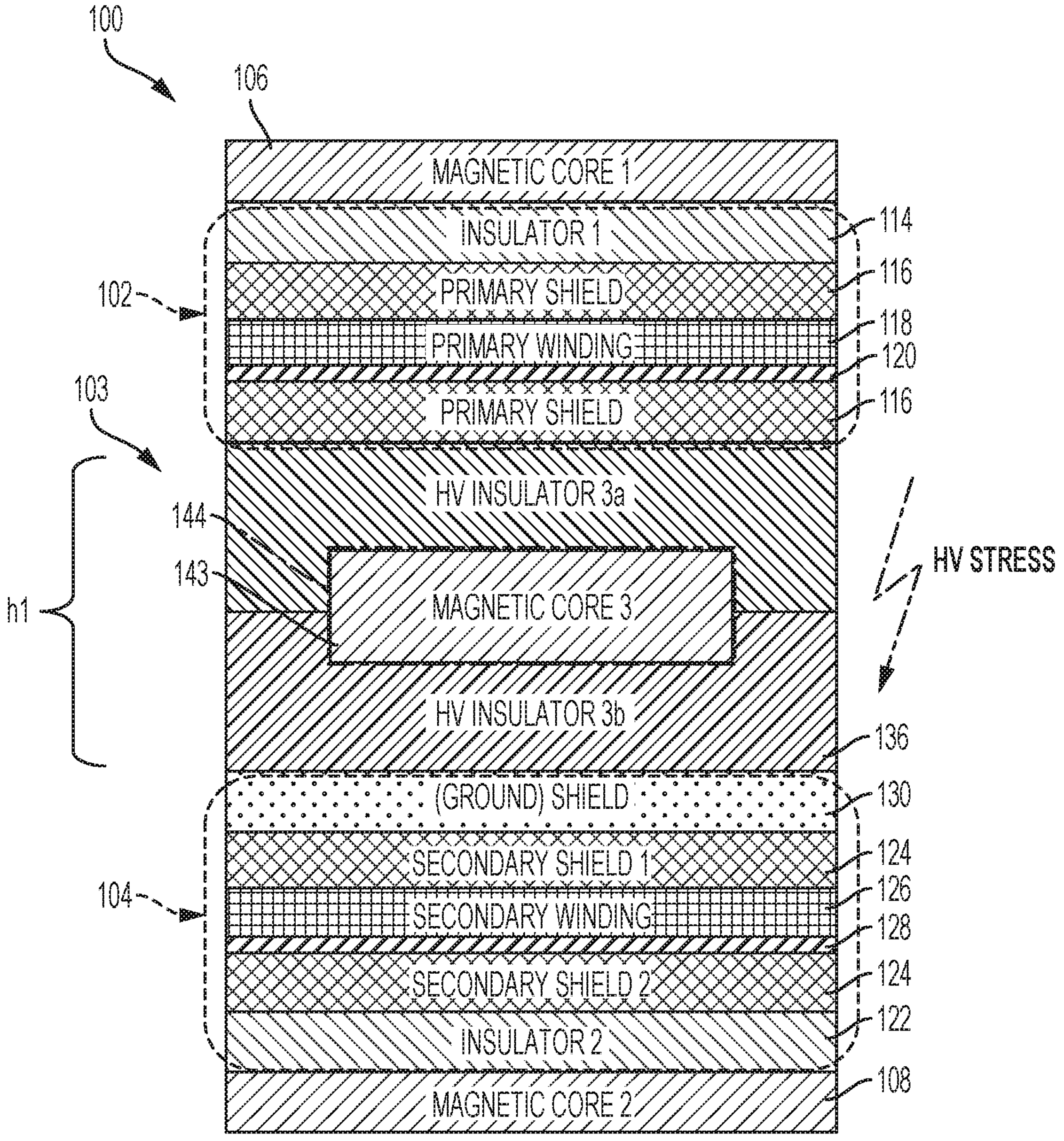
FIG. 1C is a block diagram illustrating an internal structural arrangement of the inductive wireless power transfer device illustrated in FIGS. 1A and 1B according to a non-limiting embodiment.

With reference now to FIGS. 1A, 1B and 1C, an inductive wireless power transfer device 100 is illustrated according to a non-limiting embodiment. The inductive wireless power transfer device 100 includes a primary winding assembly 102 and a secondary winding assembly 104. The primary winding assembly 102 and the secondary winding assembly 104 are separated from one another by a multi-section isolator 103, which extends along an axis (Z) to define a separation distance (h1). The distance (h1) between the primary winding assembly 102 and the secondary winding assembly 104 can range, for example, from about 0.5 inches to about 0.6 inches.

The inductive wireless power transfer device 100 further includes a first magnetic core cap 106 on the primary winding assembly 102 and a second magnetic core cap 108 on the secondary winding assembly 104. In at least one embodiment, the first magnetic core cap 106 and the second magnetic core cap 108 are shaped as discs, and are disposed directly against the primary winding and secondary winding assemblies 102 and 104, respectively. The first and second magnetic core caps 106 and 108 facilitate magnetic coupling between the primary winding assembly 102 and the secondary winding assembly 104 as described in greater detail below.

The primary winding assembly 102 includes a first safety shield layer 114, a first primary shield 116, a primary winding 118, and a primary winding insulator layer 120. The first safety shield layer 114 is interposed between the first magnetic core cap 106 and the primary shield 116. The primary winding 118 and the primary winding insulator layer 120 are surrounding or encased within the first primary winding assembly 102 using polyamide or other comparable insulating materials.

The primary winding 118 can be formed as a spiral-shaped trace composed of an electrically conductive material such as, for example, copper. The primary winding insulator layer 120 is formed directly on the first primary shield 116, while the primary winding 118 is formed directly on the primary winding insulator layer 120. The first safety shield 114, the primary shield 116 and the primary winding 118 each have terminals that extend from the first primary winding assembly 102 to provide access to an external electrical connection.

The secondary winding assembly 104 includes a secondary shield 124, a secondary winding 126, and a secondary winding insulator 128. Unlike the primary winding, no insulator layer should be interposed between the second magnetic core cap 108 and the secondary shielding 124 because the case of the secondary shield is connected to ground.

The secondary winding 126 and the secondary winding insulator layer 128 are surrounded or encased within the secondary shield 124. The secondary winding 126 can be formed as a spiral-shaped traced composed of an electrically conductive material such as, for example, copper. The secondary winding insulator layer 128 is formed directly on the secondary shield 124, while the secondary winding 126 is formed directly on the secondary winding insulator layer 128. In one or more embodiments, the secondary winding assembly 104 can include an additional ground insulating layer 130. The ground insulating layer 130 can be interposed between the multi-section HV insulator 103 and the secondary winding assembly 104.

Figure 2B:
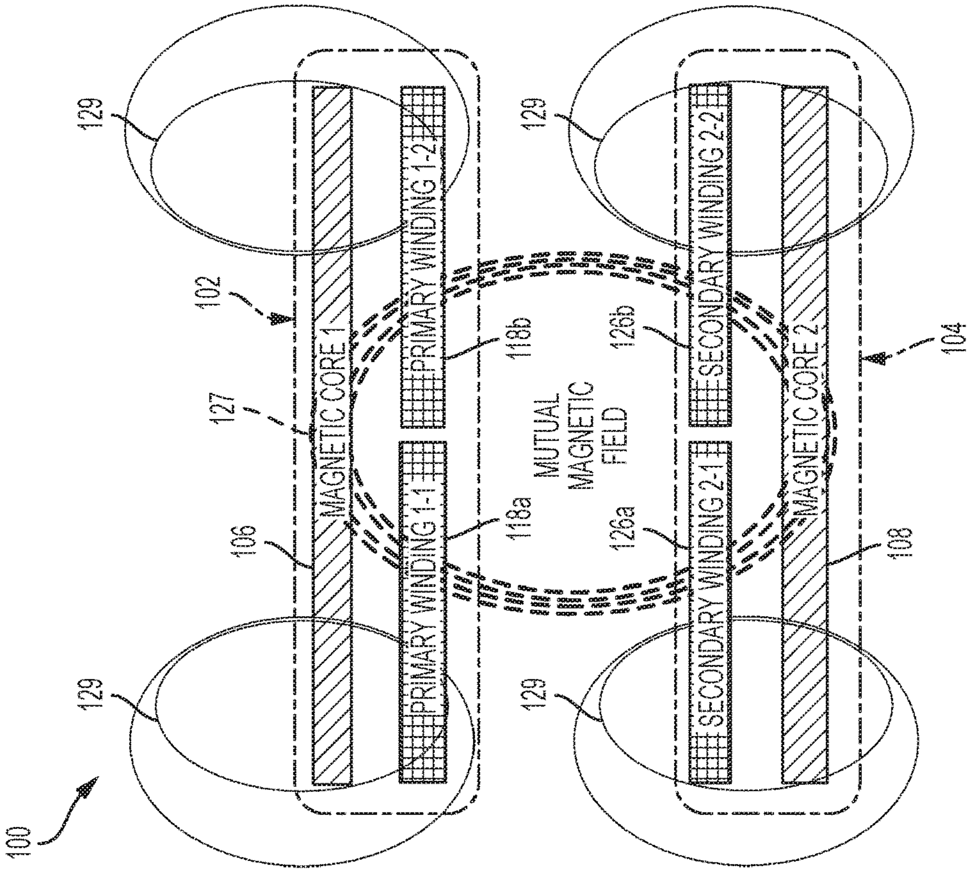
FIG. 2B illustrates a primary winding assembly and a secondary winding assembly magnetically coupled to one another via two separate pairs of magnetic coils according to a non-limiting embodiment.
Figure 2A:
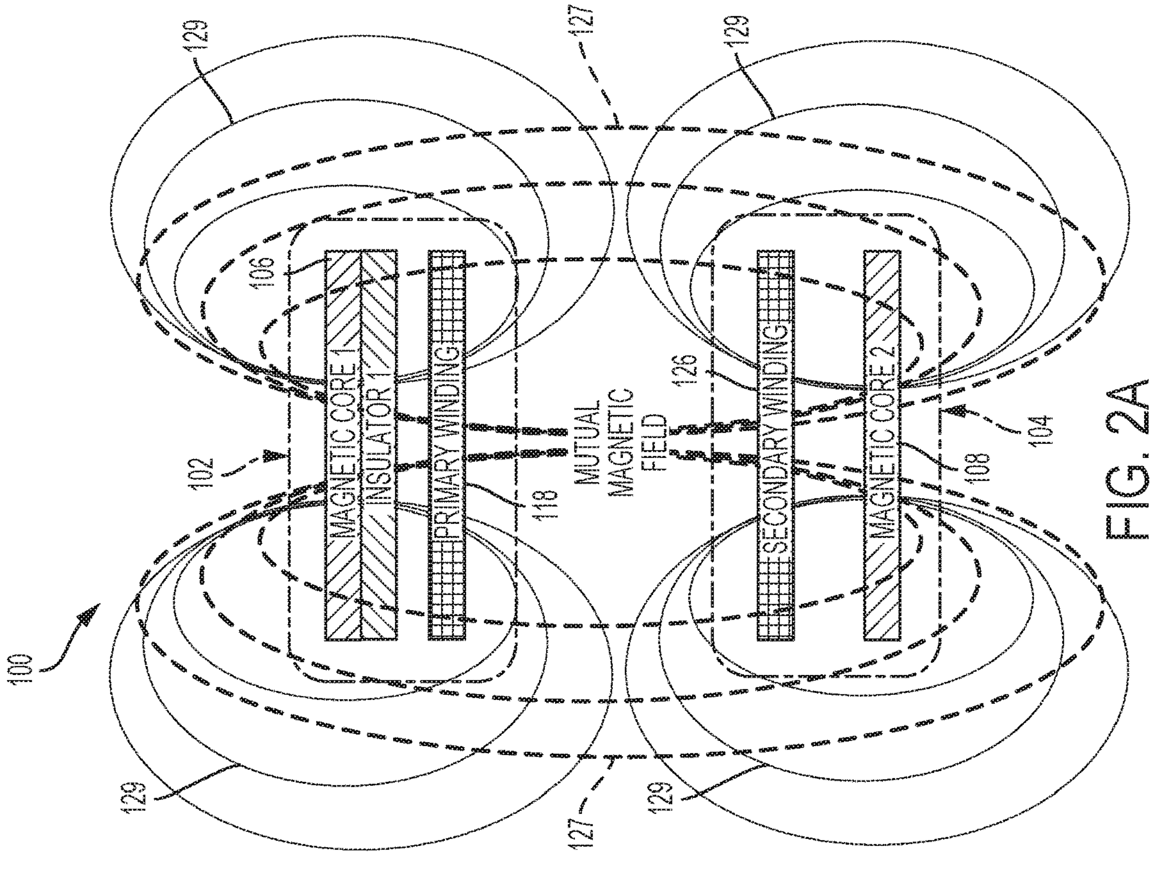
FIG. 2A illustrates a primary winding assembly and a secondary winding assembly magnetically coupled to one another via a single pair of magnetic coils according to a non-limiting embodiment.

Turning to FIG. 2A, for example, the primary and secondary winding assemblies 102 and 104 are shown as being magnetically coupled to one another via a single pair of magnetic coils, i.e., a single primary winding 118 and a single secondary winding 126. The combination of a given winding (e.g., 118) and magnetic core cap (e.g. 106) in each of the primary winding assembly 102 and the secondary winding assembly 104 generates magnetic fields. The magnetic fields are mutually shared by the primary and secondary winding assemblies 102 and 104 such that they are "magnetically coupled" to one another.

Although a single pair of magnetic coils 118 and 126 are illustrated in FIG. 2A, the invention is not limited thereto. FIG. 2B, for example, illustrates the primary and secondary winding assemblies 102 and 104 being magnetically coupled to one another via two separate pairs of primary magnetic coils 118*a*-118*b* and secondary magnetic coils 126*a*-126*b* according to a non-limiting embodiment. Each magnetic coil 118*a*-118*b* and 126*a*-126*b* included in a respective pair is arranged next to one another, e.g., side-by-side. In this manner, the magnetic coupling strength (k) between the primary and secondary winding assemblies 102 and 104 is increased, while stray magnetic fields 129 are reduced.

Referring again to FIGS. 1A-1C, the multi-section HV isolator 103 includes one or more insulator sections 132 and one or more intermediate magnetic cores 134 interposed between the primary winding assembly 102 and the secondary winding assembly 104. The insulator sections 132 are composed of a dielectric material including, but not limited to, polytetrafluoroethylene (PTFE), while the magnetic core (s) 134 is composed of a ferrite material such as, for example, a manganese-nickel ferrite material, manganese-zinc ferrite material, or combination thereof.

In at least one embodiment, the multi-section HV isolator 103 includes a core isolator region 136 extending along axis (Z) between a first core isolator portion 138 and an opposing second core isolator portion 140 to define a core isolator height (h2) (see FIG. 1B). The core isolator height (h2) can range, for example, from about 0.3 inches to about 0.5 inches. The core isolator portion 138 also extends along a second axis (X) perpendicular to axis (Z) to define an isolator width. In at least one embodiment suitable for protected (e.g., indoors) environment, the core isolator region 136 can have a cylindrical shape having a diameter ranging from about 0.195 inches to about 0.205 inches. The core isolator region 136 includes a cavity 135 configured to support the intermediate magnetic core 134 therein. In at least one embodiment, the intermediate magnetic core 134 can be formed as non-sectioned ferrite core, and embedded in the middle of the multi-section HV isolator 103. In this embodiment, the intermediate magnetic core 134 extends along axis (Z) to define a ferrite core height, and extends along the second axis to define a ferrite core width that typically is less than the ferrite core height.

The individual insulator sections 132 extend radially from the core isolator region 136. Each individual insulator section 132 is separated from one another by a void 133. The distance (h3) between each insulator section 132 (i.e., defined by a given void) ranges, for example, from about 0.075 inches nm to about 0.085 inches. In at least one non-limiting embodiment, each individual insulator section 132 has a disc-shaped, and includes an exterior disc sidewall extending parallel with the vertical axis between a first disc surface and an opposing second disc surface to define an insulator height. The disc-shaped insulator sections 132 can have a diameter (i.e., extending radially from the core portion 136), for example, of about 1 inch, and a thickness (i.e., along the z-axis) of about 0.08 inches. The middle non-sectioned ferrite core 134 can extend through the center of each disc-shaped insulator section 132.

Figure 3B:
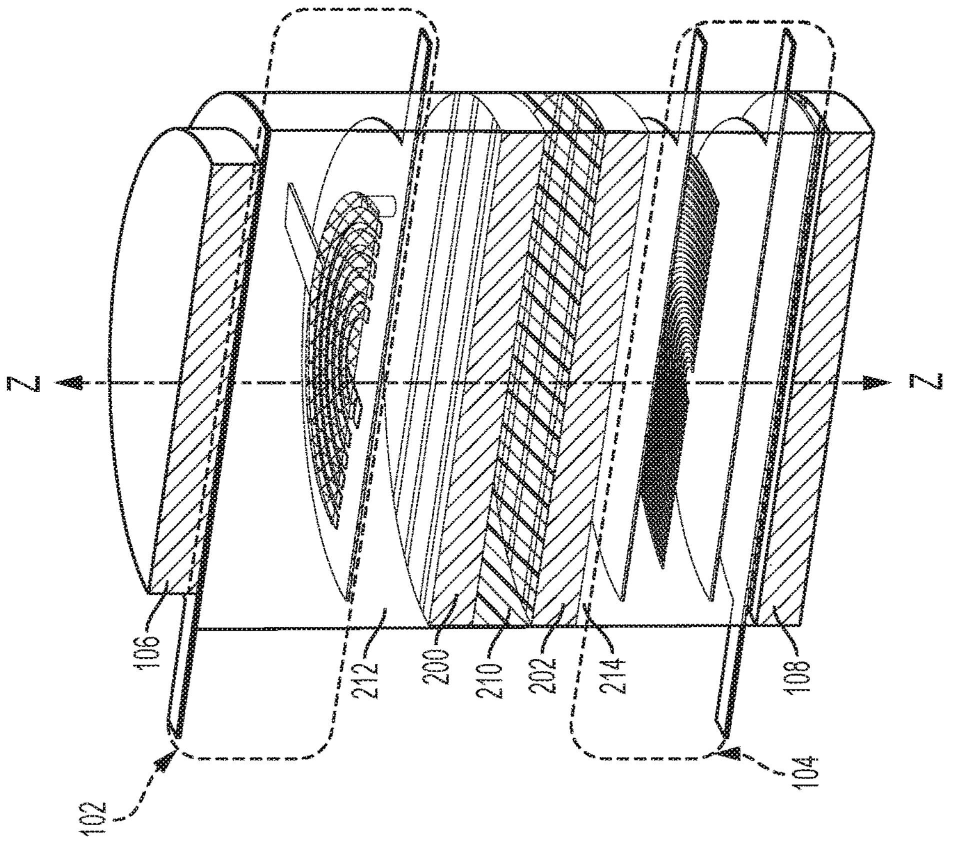
FIG. 3B is a cross-sectional view of the inductive wireless power transfer device illustrated in FIG. 3A.
Figure 3A:
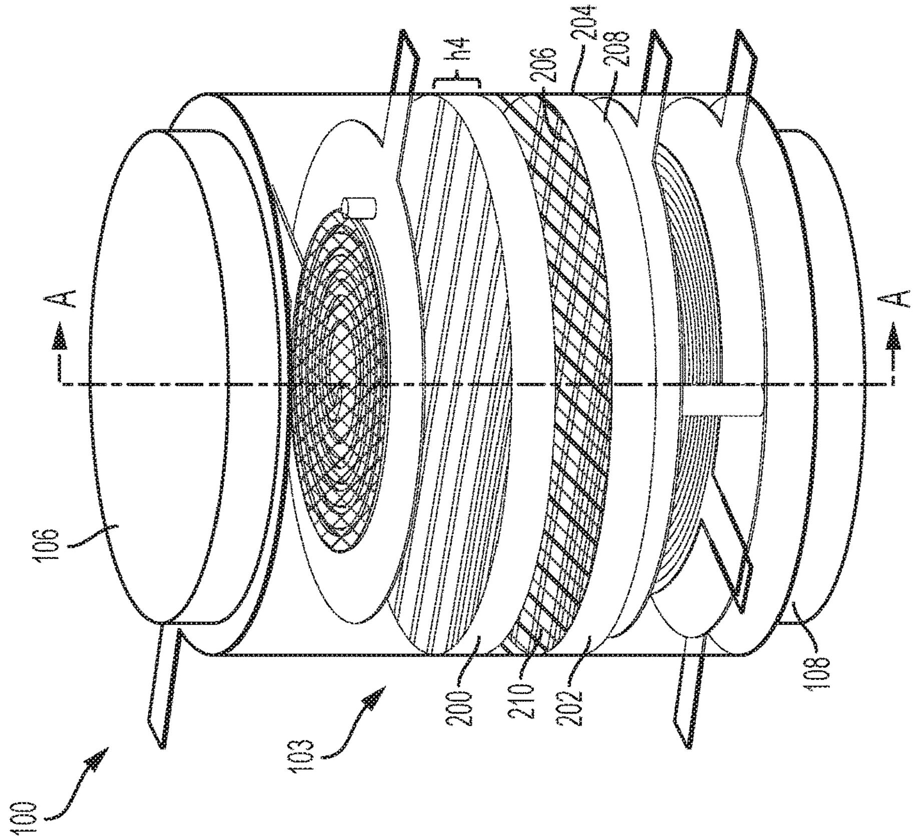
FIG. 3A is a perspective view of an inductive wireless power transfer device according to another non-limiting embodiment.
Figure 3C:
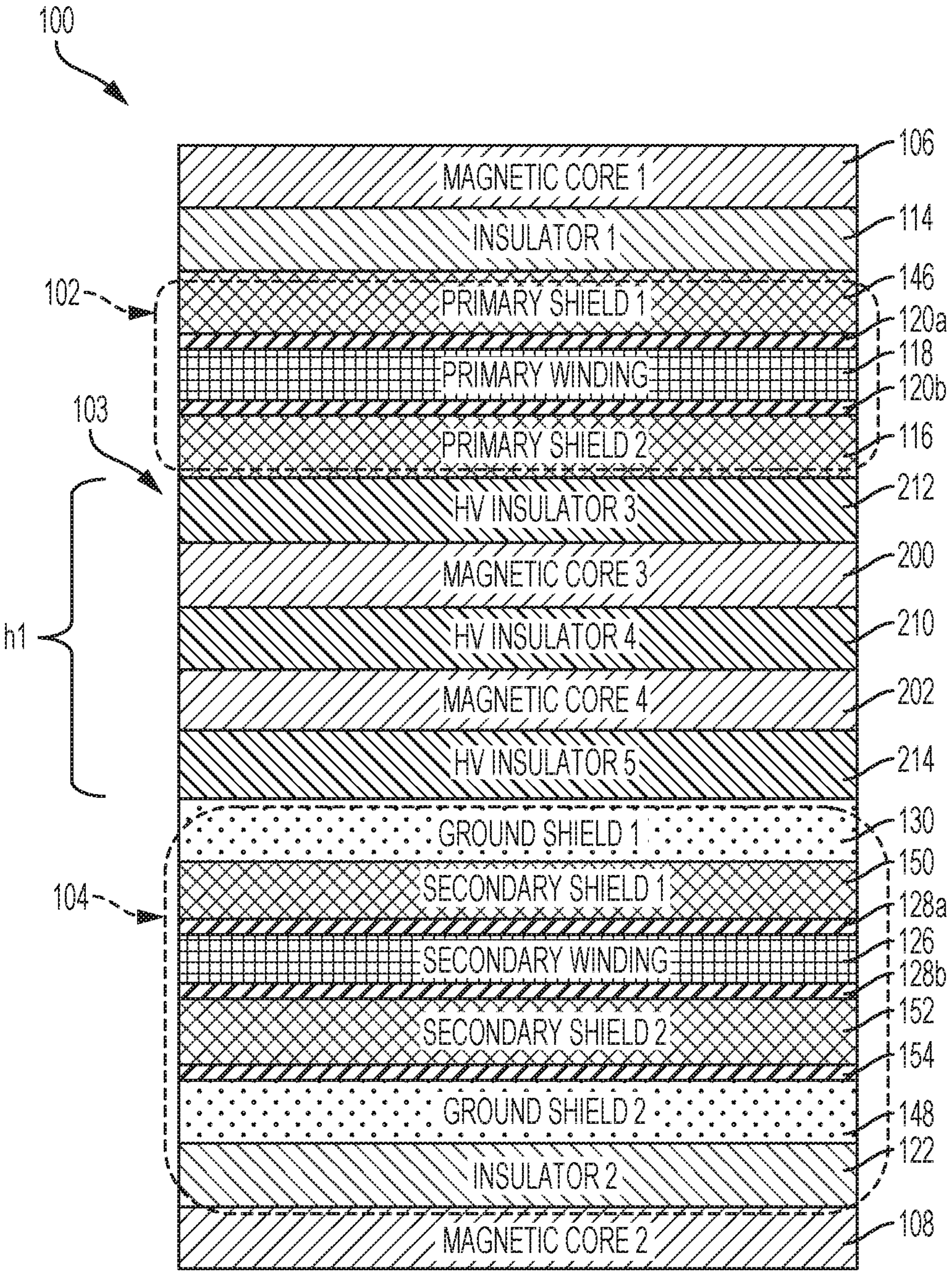
FIG. 3C is a block diagram illustrating an internal structural arrangement of the inductive wireless power transfer device illustrated in FIGS. 3A and 3B according to a non-limiting embodiment.

Turning now to FIGS. 3A, 3B and 3C, the inductive wireless power transfer device 100 is illustrated according to another non-limiting embodiment. In this embodiment, the intermediate magnetic core 134 is constructed as one or more individual layers instead of a single, non-sectioned middle ferrite core that extends through the individual insulator sections 132. For example, the intermediate magnetic core can include a first individual core layer 200 and a second individual core layer 202 spaced apart from the first individual core layer 200 along axis (Z). Each of the first and second individual core layers 200 and 202 extend radially from axis (Z) to define a width. The first and second individual core layers 200 and 202 include an exterior sidewall 204 extending parallel with axis (Z) between a first layer surface 206 and an opposing second layer surface 208 to define a layer thickness (h4) that is typically less than the layer width. The first and second individual core layers 200 and 202 can be composed of a ferrite material such as, for example, a nickel-zinc ferrite material, manganese-zinc ferrite material, or combination thereof. The first and second individual core layers 200 and 202 can also be formed as a rigid layer, or as flexible layer such as, for example, a flexible sintered ferrite layer.

Still referring to FIGS. 3A-3B, the multi-section HV isolator 103 includes a first intermediate insulator layer 210, a second intermediate insulator layer 212, and a third intermediate insulator layer. The first intermediate insulator layer 210 is interposed between the first and second individual core layers 200 and 202. In at least one embodiment, the first intermediate insulator layer 210 is disposed directly against a surface of the first individual core layer 200 and a surface of the second individual core layer 202.

The second intermediate insulator layer 212 is interposed between the first individual core layer 200 and the primary winding assembly 102, while the third intermediate insulator layer 214 is interposed between the second individual core layer 202 and the secondary winding assembly 104. The first, second, and third intermediate insulator layers 210, 212 and 214 can be composed of a dielectric material including, but not limited to, polytetrafluoroethylene (PTFE).

Instead of extending through the centers of the individual insulator sections, the first and second individual core layers 200 and 202 can have a surface area that matches or substantially matches the surface area of the primary and secondary winding assemblies 102 and 104. In this manner, the primary winding assembly 102 can be disposed directly on a surface of the first individual core layer 200, and the secondary winding assembly 104 can be disposed directly on a surface of the second individual core layer 202.

Still referring to FIGS. 3A-3C, the primary winding assembly 102 includes a first insulator cap layer 114, a primary shield 1 layer 146, a primary winding 118, a primary winding insulator layers 120*a* and 120*b*, and a primary shield layer 116. The first insulator cap layer 114 is interposed between the first magnetic core cap 106 and the primary shield 1 layer 146. The primary winding 118 and the primary winding insulator layers 120*a* and 120*b* are surrounded by the primary HV insulator layer 146 and the HV insulator 3 layer 212. The primary winding 118 can be formed as a spiral-shaped traced composed of an electrically conductive material such as, for example, copper. The primary winding insulator layers 120*a* and 120*b* are formed directly on the primary shielding layers 146 and 116, respectively, while the primary winding 118 is formed directly on the primary winding insulator layer 120. The primary winding 118 and primary shielding layers 146 and 116 each have terminals to provide access to an external electrical connection. In at least one embodiment, layers 114 and 120 can comprise of polyamide or a comparable dielectric material, while layers 116 and 146 comprise a metal material to provide metal shields.

The secondary winding assembly 104 includes a second insulator cap layer 122, a first ground shield layer 130, a first secondary shield layer 150, a secondary winding 126, a secondary winding insulator layers 128*a* and 128*b*, a second secondary shield layer 152, a ground insulator layer 154, and a second ground shield layer 148. The second insulator cap layer 122 is interposed between the second magnetic core cap 108 and the first secondary ground shield layer 148. The secondary winding 126 and the secondary winding insulator layers 128*a* and 128*b* are surrounded by the first secondary shield layer 150 and the secondary shield layer 152. The secondary winding 126 can be formed as a spiral-shaped traced composed of an electrically conductive material such as, for example, copper. The secondary winding insulator layers 128*a* and 128*b* are formed directly on the first secondary shield layer 150 and the secondary shield layer 152, respectively, while the secondary winding 126 is formed directly on the secondary winding insulator layer 128*b*. In one or more embodiments, the secondary winding assembly 104 can include an additional secondary HV insulating layer 148, and a second ground insulating layer 122. The first ground shield layer 130 can be interposed between the multi-section HV insulator 103 (e.g., the third intermediate insulator layer 214) and the first secondary shield layer 150. The second secondary ground shield layer 148 can be interposed between the second insulator cap layer 122 and the ground insulator layer 154. In at least one embodiment, the insulating layers 122 and 128 can comprise polyamide or comparable dielectric material, while layers 150, 148, 152 and 130 comprise a metal material to provide metal shields.

Figure 4:
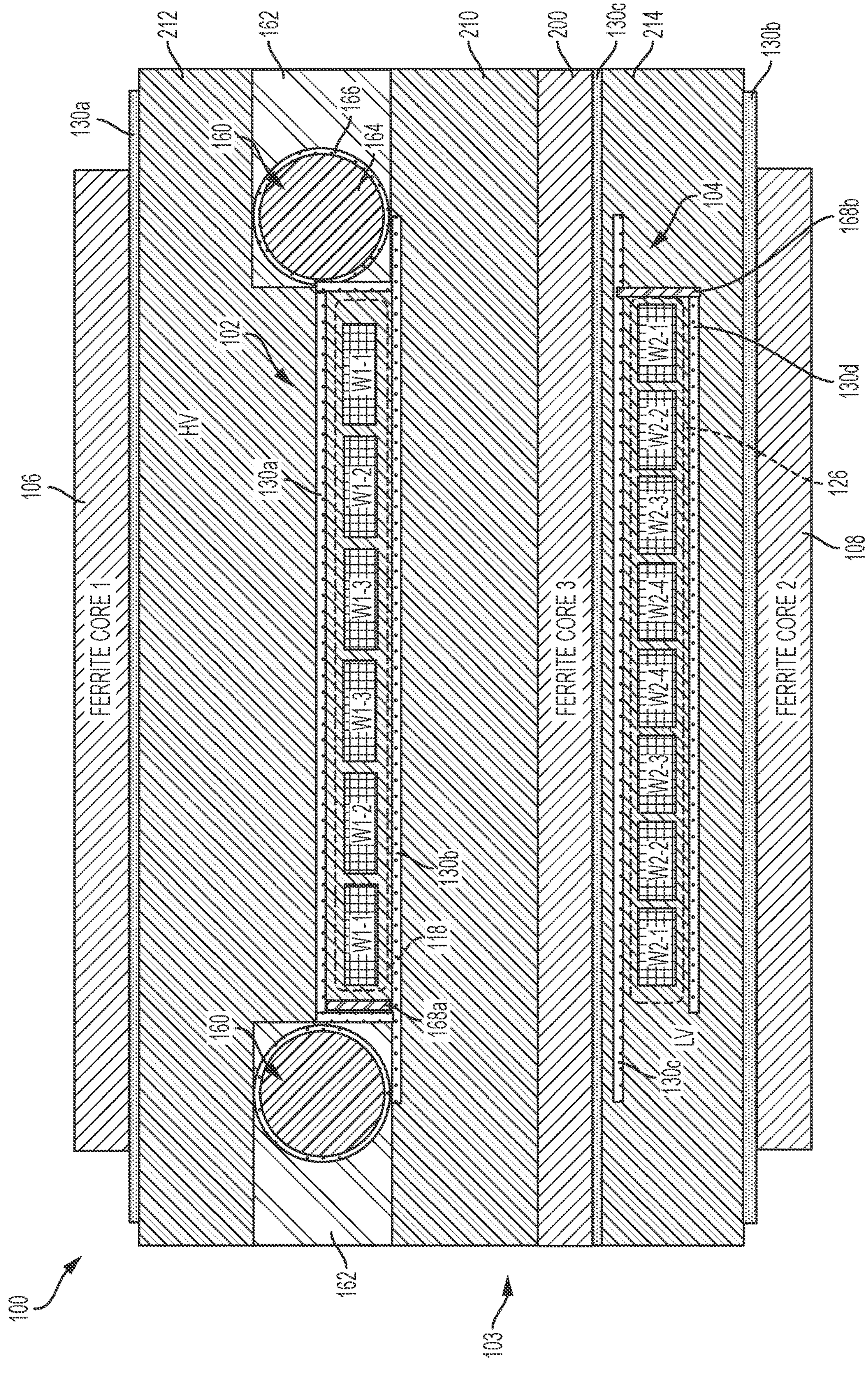
FIG. 4 illustrates an inductive wireless power transfer device including printed wiring board (PWB)-based windings is illustrated according to a non-limiting embodiment.

Turning now to FIG. 4, an inductive wireless power transfer device 100 including printed wiring board (PWB)-based windings is illustrated according to a non-limiting embodiment. In this example, the inductive wireless power transfer device 100 can use one or more built-in toroidal field equalizers to reduce electric field intensity and ionization.

The inductive wireless power transfer device 100 includes a first magnetic core cap 106 associated with a primary winding assembly 102 and a second magnetic core cap 108 associated with a secondary winding assembly 104 so as to magnetically couple together the primary winding assembly 102 and the secondary winding assembly 104. An intermediate magnetic core layer 200 is interposed between the first magnetic core cap 106 and the secondary core cap 108. Individual insulating layer 210, 212 and 214 are interposed between the first magnetic core cap 106, the intermediate magnetic core layer 200, and the secondary core cap 108.

The inductive wireless power transfer device 100 further includes a PWB-based primary winding 118, a PWB-based secondary winding 126, and one or more toroidal field equalizers 160. A PWB-based winding refers to a winding that is formed as an electrically conductive trace on a PWB. The PWB can include a corona-resistant material with random orientation of fibers (e.g. Kevlar), while the trace is formed thereon.

The primary winding 118 is surrounded by a pair of first and second primary shielding layers 130*a* and 130*b*. The first and second shielding layers are connected together by a first via 168*a*. Similarly, the secondary winding 126 is surrounded by a pair of first and second ground shielding layers 130*c* and 130*d*. The first and second ground shielding layers are also connected together by a second via 168*b*.

The toroidal field equalizer 160 is surrounded by an electrical insulating filling 162, and is configured to suppress high-voltage partial discharge (sometimes referred to as corona). In one embodiment, the toroidal field equalizer 160 includes a compressible insulating core 164 surrounded by a spiral beryllium or metal spring 166. The metal spring 166 is connected to one of the primary shielding layers, e.g., 130*b*.

As described herein, an inductive wireless power transfer device is provided which employs a multi-section HV isolator including one or more individual isolator sections interposed between a primary energy coil (i.e., primary winding) and a secondary energy coil (i.e., secondary winding). The multi-section HV isolator further includes a magnetic material arranged between the primary and secondary windings to form one or more intermediate cores. The implementation of the multi-section HV isolator allows inductive wireless power transfer device to achieve a substantial improvement in power transfer efficiency compared to conventional devices, while maintaining necessary HV isolation for providing HV protection capabilities.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An inductive wireless power transfer device comprises:

a primary winding assembly and a secondary winding assembly separated from the primary winding assembly by a distance;

a first magnetic core cap on the primary winding assembly and a second magnetic core cap on the secondary winding assembly so as to magnetically couple together the primary winding assembly and the secondary winding assembly; and a multi-section high voltage (HV) isolator interposed between the primary winding assembly and the secondary winding assembly, the multi-section HV isolator including at least one individual insulator section comprising a dielectric material, and at least one intermediate magnetic core comprising a ferrite material interposed between the primary winding assembly and the secondary winding assembly, wherein the multi-section HV isolator includes a core isolator portion extending along a first axis between a first core isolator portion and an opposing second core isolator portion to define a core isolator height, and an outer isolator surface extending along a second axis perpendicular to the first axis to define an isolator width, and wherein the at least one intermediate magnetic core includes a middle non-sectioned ferrite core embedded in the core isolator portion, the middle section ferrite core extending along the first axis to define a ferrite core height, and extending along the second axis to define a ferrite core width that is less than the ferrite core height.

2. The inductive wireless power transfer device of claim 1, wherein the at least one individual insulator section includes a plurality of insulator sections extending radially from the core isolator portion.

3. The inductive wireless power transfer device of claim 2, wherein each individual insulator section has a disc shape, the individual insulator sections being separated from one another by a void.

4. The inductive wireless power transfer device of claim 3, wherein the disc-shaped insulator sections include an exterior disc sidewall extending parallel with the vertical axis between a first disc surface and an opposing second disc surface to define an insulator height.

5. The inductive wireless power transfer device of claim 4, wherein the middle non-sectioned ferrite core extends through the center of each disc-shaped insulator section.

6. The inductive wireless power transfer device of claim 1, wherein the at least one intermediate magnetic core includes a first individual core layer and a second individual core layer spaced apart from the first individual core layer along the first axis.

7. The inductive wireless power transfer device of claim 6, wherein the first and second individual core layers extend radially from the first axis to define a layer width, and include an exterior sidewall extending parallel with the vertical axis between a first layer surface and an opposing second layer surface to define a layer thickness that is less than the layer width.

8. The inductive wireless power transfer device of claim 7, wherein multi-section HV isolator includes a first intermediate insulator layer interposed between the first and second individual core layers.

9. The inductive wireless power transfer device of claim 8, wherein the first individual core layer is directly on a first surface of the first intermediate insulator layer, and the second individual core layer is on an opposing second surface of the first intermediate insulator layer.

10. The inductive wireless power transfer device of claim 8, wherein multi-section HV isolator further includes a second intermediate insulator layer interposed between the first individual core layer and the primary winding assembly, and a third intermediate insulator layer interposed between the second individual core layer and the secondary winding assembly.

11. The inductive wireless power transfer device of claim 10, wherein the primary winding assembly includes a primary winding interposed between a first insulator cap layer and a primary winding insulator layer.

12. The inductive wireless power transfer device of claim 11, wherein the primary winding assembly further includes a primary shield interposed between the first magnetic core cap and the multi-section HV isolator, and wherein the primary winding and the primary winding insulator layer are disposed within the primary shield.

13. The inductive wireless power transfer device of claim 12, wherein the secondary winding assembly includes a secondary winding interposed between a second insulator cap layer and a secondary winding insulator layer.

14. The inductive wireless power transfer device of claim 13, wherein the secondary winding assembly further includes a secondary shield interposed between the second magnetic core cap and the multi-section HV isolator, and wherein the secondary winding and the secondary winding insulator layer are disposed within the secondary shield.

15. A method of increasing power transfer in an inductive wireless power transfer device, the method comprising:

separating a primary winding assembly from a secondary winding assembly by a distance;

arranging a first magnetic core cap on the primary winding assembly and arranging a second magnetic core cap on the secondary winding assembly so as to magnetically couple together the primary winding assembly and the secondary winding assembly; and interposing a multi-section high-voltage (HV) isolator between the primary winding assembly and the secondary winding assembly so as to increase the coupling between the primary winding assembly and the secondary winding assembly, the multi-section HV isolator including at least one individual insulator section comprising a dielectric material, and at least one intermediate magnetic core comprising a ferrite material interposed between the primary winding assembly and the secondary winding assembly, wherein the multi-section HV isolator includes a core isolator portion extending along a first axis between a first core isolator portion and an opposing second core isolator portion to define a core isolator height, and an outer isolator surface extending along a second axis perpendicular to the first axis to define an isolator width, and wherein the at least one intermediate magnetic core includes a middle non-sectioned ferrite core embedded in the core isolator portion, the middle section ferrite core extending along the first axis to define a ferrite core height, and extending along the second axis to define a ferrite core width that is less than the ferrite core height.

16. The method of claim 15, wherein a first individual core layer and a second individual core layer are spaced apart from the first individual core layer along the first axis.

* * * * *